Feb. 9, 1926.
F. VAN VALKENBURG
1,572,335
TOY VEHICLE
Filed Feb. 5, 1925
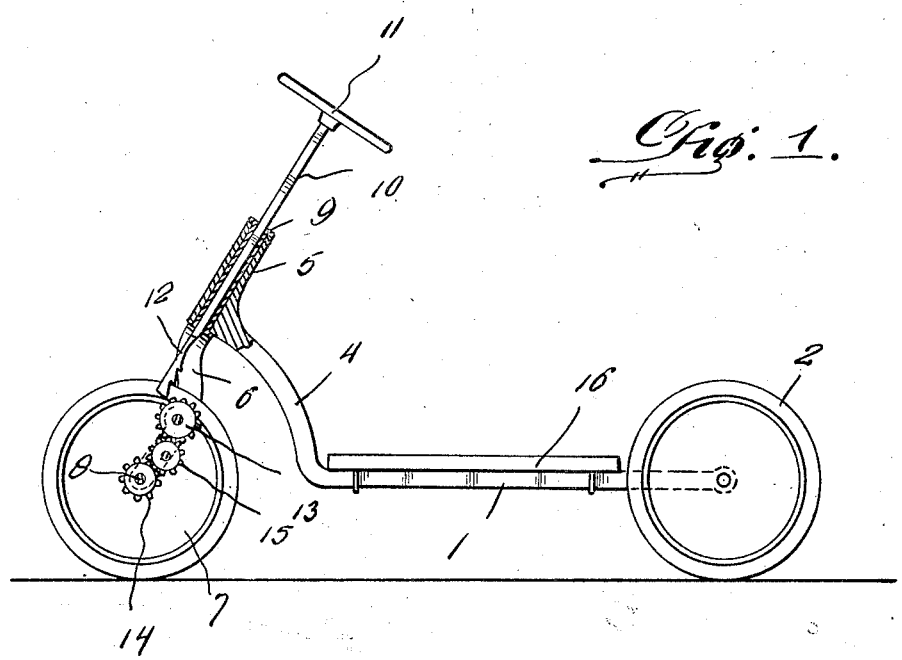
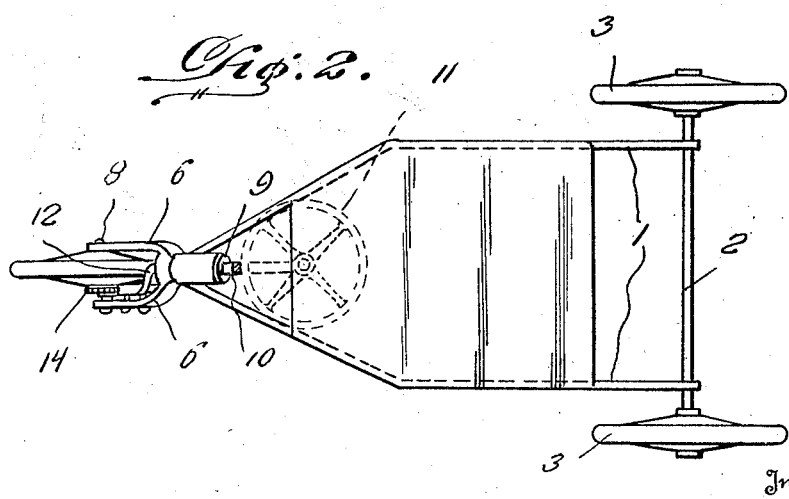
Inventor
F. Van Valkenburg,
By Clarence O'Brien
Attorney Patented Feb. 9, 1926.

1,572,335

UNITED STATES PATENT OFFICE.

FREEMAN VAN VALKENBURG, OF KINGSTON, NEW YORK.

TOY VEHICLE.

Application filed February 5, 1925. Serial No. 7,063.

*To all whom it may concern:*

Be it known that I, FREEMAN VAN VALKENBURG, a citizen of the United States, residing at Kingston, in the county of Ulster and State of New York, have invented certain new and useful Improvements in Toy Vehicles, of which the following is a specification.

This invention relates to an improved toy vehicle, and it has more particular reference to the type of vehicle including a wheel supported base, which is quite close to the ground, and is adapted to permit the operator to ride thereon in a standing position.

The principal feature of the invention is to provide a vertically reciprocable steering rod, which has the double function of guiding and driving the vehicle, there being a novel driving connection between the lower end of the rod and the axle of the front wheel, whereby the front wheel may be rotated at a comparatively rapid speed, under the vertical reciprocation of the steering rod.

The invention embodies other structural details which are productive of important features and advantages, and these will become apparent from the following description and drawing.

In the accompanying drawing, forming a part of this application, and in which like numerals are employed to designate like parts throughout the same:

Figure 1 is a side elevation, partly in section of a vehicle constructed in accordance with the present invention.

Figure 2 is a top plan view thereof, with the hand wheel shown in dotted lines, and the reciprocatory steering shaft in section.

Referring to the drawing in detail, it will be seen that the device comprises a horizontally disposed supporting frame, embodying spaced side bars 1, provided at their rear ends with bearings in which a shaft 2 is journaled for rotation, there being wheels 3 fixedly mounted upon the outer ends of the shaft 2. At their forward ends, the members 1 converge and are connected together, there being an upwardly curved portion 4 at their point of connection. At the upper end of the part 4 is a forwardly and downwardly inclined tube 5. A bushing 9 is rotatable in the tube 5. A fork depends from the lower end of the bushing, the arms 6 of which straddle the front driving wheel 7, carrying the driven axle 8, rotatably mounted in bearings at the lower ends of the arms.

As before stated, the novelty of the invention resides more particularly in the driving conection or means for turning the front drive wheel 7. The bushing 9 is provided with a bore, which is polygonal in cross section. Vertically slidable through this bore is a correspondingly shaped steering rod 10, at the upper end of which is an end wheel 11. The lower end of the rod is fashioned to provide rack teeth 12 on one side, these being adapted to mesh with the teeth of a gear 13 rotatably mounted on a journal stud carried by one of the arms of the aforesaid fork. A pinion 14 is fixedly mounted on the drive shaft 8, and an idler gear 15 is interposed between the gear 13 and pinion, serving to impart forward movement of the vehicle, when the steering rod 10 is reciprocated, to impart rotation to the gear 13.

In practice, the operator stands upon the foot-board 16 carried by the supporting frame, and grasps the hand wheel 11, reciprocating the rod 10 vertically through the bushing 9 and causing the rack teeth 12 to act on the gear 13, to impart rotation to the pinion 14 through the medium of the idlers 15. Obviously, the front wheel will thus be driven, and the vehicle will be carried along at a comparatively fast rate of speed.

I would direct attention to the fact that that portion of the bar 10 adjoining the toothed part 12 with the body portion is comparatively thin, so as to render it sufficiently flexible, so that on the upstroke of the rod, the rack teeth will properly ratchet over the teeth of the gear 13.

It is thought that the foregoing description, taken in connection with the accompanying drawing, will enable persons skilled in the art to which the invention relates to obtain a clear understanding. For this reason, a more lengthy description is thought unnecessary.

Although the preferred embodiment of the invention has been shown and described, it is to be understood that minor changes coming within the field of the invention may be resorted to, if desired. For instance, instead of providing a hand wheel at the top of the steering rod, a cross bar or other suitable form of handle may be provided.

I claim:

A toy vehicle of the class described comprising a base upon which the operator is adapted to be supported, a frame upon which said base is mounted, a plurality of wheels for supporting said frame, one of said wheels being located at the forward end of the frame, and functioning as a combined drive and steering wheel, a fork, the arms of which straddle said combined drive and steering wheel, a tube on the forward end of the frame, a bushing rotatably mounted in the tube and connected with the fork, said bushing having a polygonal bore, a reciprocable rod of polygonal cross section slidable through the bushing, a wheel at one end of the rod, the other end of the rod being resilient and having ratchet teeth, gearing engageable by said ratchet teeth and operatively associated with the combined drive and steering wheels.

In testimony whereof I affix my signature.

FREEMAN VAN VALKENBURG.